Figure 3:
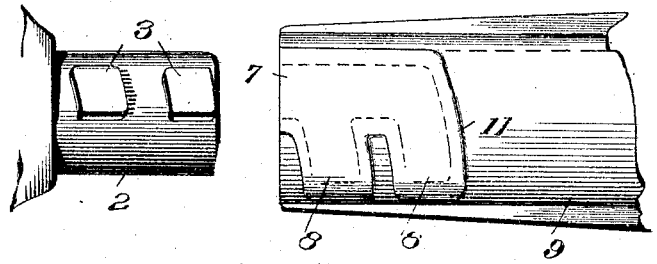

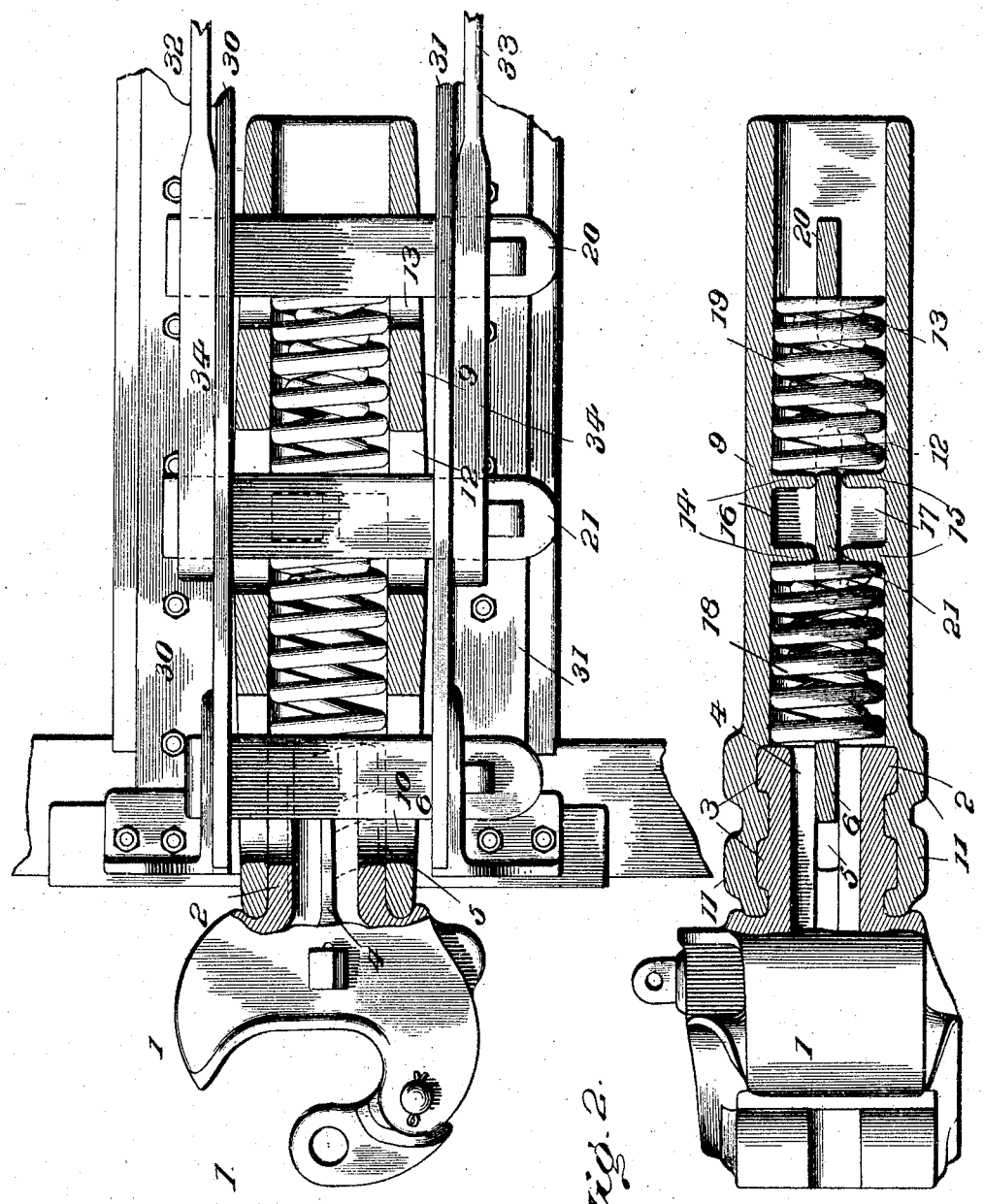

No. 781,127. PATENTED JAN. 31, 1905.
P. BROWN.
DRAFT MECHANISM.
APPLICATION FILED FEB. 21, 1902.

3 SHEETS—SHEET 2.

Witnesses
Jno. ——
J. Stewart Rice.

Inventor
Perry Brown.
By
Thos. E. Robertson, Attorney

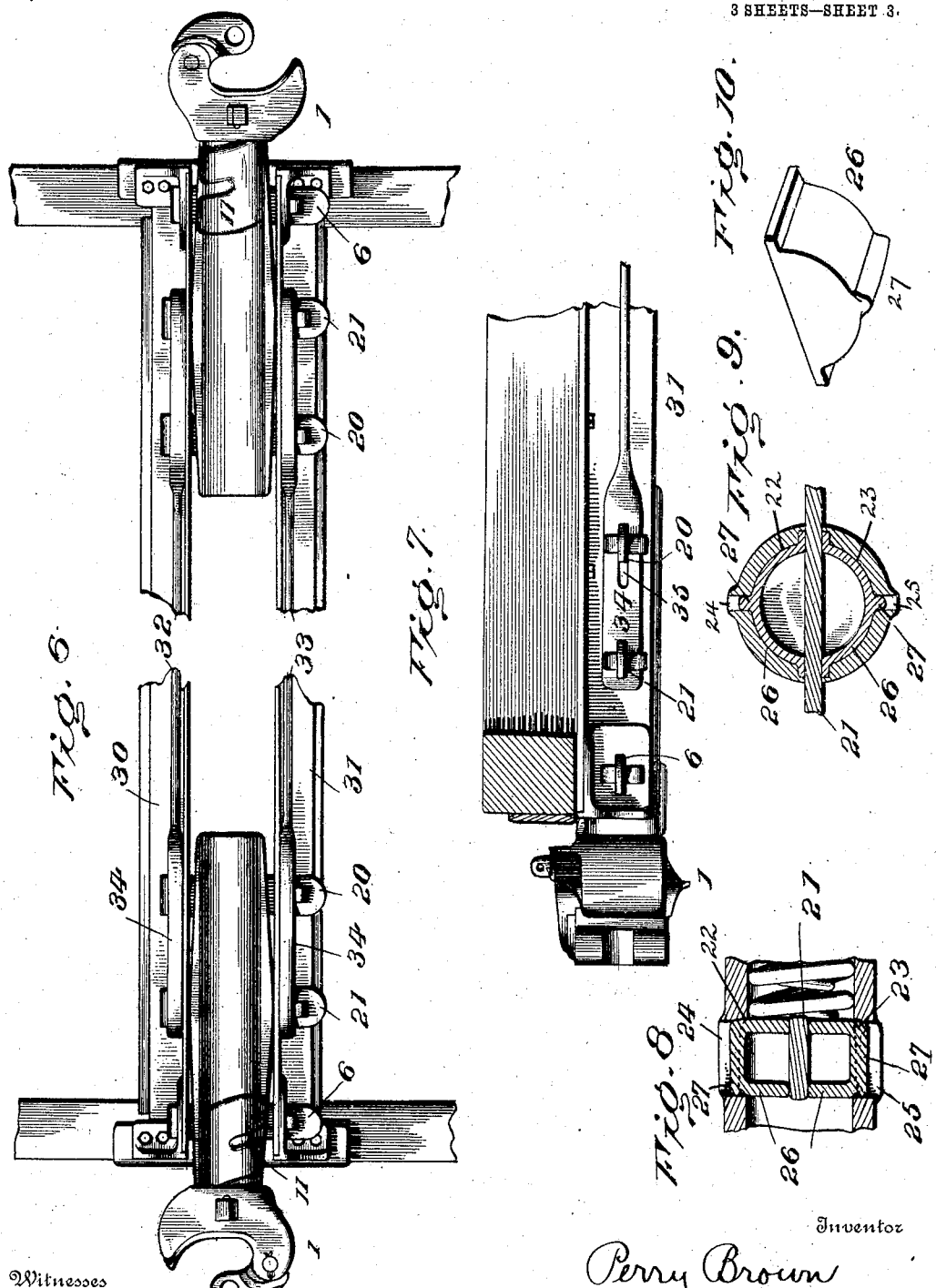

No. 781,127. Patented January 31, 1905.

UNITED STATES PATENT OFFICE.

PERRY BROWN, OF WILMINGTON, DELAWARE.

DRAFT MECHANISM.

SPECIFICATION forming part of Letters Patent No. 781,127, dated January 31, 1905.

Application filed February 21, 1902. Serial No. 95,101.

*To all whom it may concern:*

Be it known that I, PERRY BROWN, a citizen of the United States of America, and a resident of Wilmington, in the county of Newcastle and State of Delaware, have invented certain new and useful Improvements in Draft Mechanism, of which the following is a specification.

This invention relates to improvements in draft mechanism for railway-cars, and more particularly to that class of mechanism shown in my Patent No. 671,370, of April 2, 1901; and one of the objects of the invention is to provide a combined mechanism and car-coupling which shall have all of the advantages of that illustrated in the patent referred to and yet be capable of being formed in two main divisions, so that in the event of breakage of either of said divisions the other will not be rendered useless.

Another object is to provide an arrangement by which the springs, when the tandem form of mechanism is used, can be placed in position from opposite ends of the shell or housing of the mechanism, and I am enabled to accomplish this by reason of forming the combined coupling and draft mechanism in the two main parts above suggested.

With these main objects before me my invention consists in the mechanism as shown in its preferable embodiment in the drawings accompanying this application and as will be now more particularly described and then definitely claimed.

Figure 4:
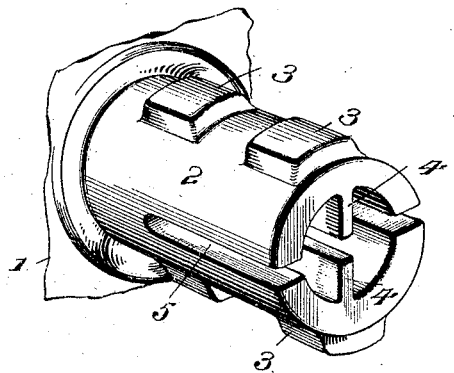
Figure 5:
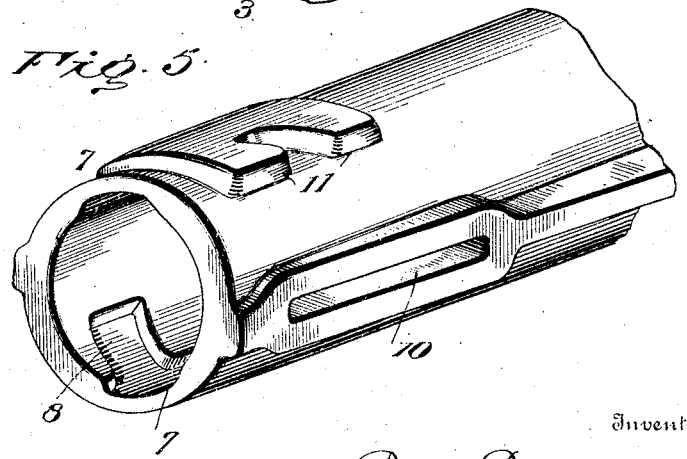

In the said accompanying drawings, Figure 1 represents a bottom plan view, mostly in section, of a combined coupling and draft mechanism constructed in accordance with my improvement. Fig. 2 is a similar view taken at right angles to that shown in Fig. 1. Fig. 3 represents the shank of the coupling in side elevation and the complementary end of the shell or casing of the draft mechanism. Fig. 4 represents a perspective detail of the shank of the coupling. Fig. 5 is a similar view of the end of the shell or casing. Fig. 6 is a bottom plan view of part of a car with my improvement applied thereto. Fig. 7 is a side elevation of one end of the same. Figs. 8, 9, and 10 are details of a modification.

Referring now to the details of the drawings by numerals, 1 indicates the coupling-head, which may be of any desired construction, except as hereinafter noted. The shank of this coupling instead of being formed integral with the shell or casing of the draft mechanism, as shown in my hereinbefore-mentioned patent, or instead of being continued some distance to the rearward and having a yoke or strap connected therewith, is made, preferably, in the shape of a short cylindrical extension, (indicated at 2, see especially Figs. 3 and 4,) and this extension or shank 2 is provided with two raised portions 3 formed on the top and bottom thereof. The shank is also preferably made hollow, as shown in Figs. 2 and 4, in which case it is strengthened by integral ribs 4. Extending horizontally through the shell of the shank are two horizontal slots 5, through which passes one of the bars 6, forming part of the draft mechanism.

The shell or casing of the draft mechanism which forms the second main division of my invention is provided at one end with recesses 7, into which the raised portions 3 of the shank may enter, and said recesses 7 have recesses or passages 8 leading therefrom at substantially right angles thereto. This construction enables the person assembling the two main parts of the combined device to slip the shank 2 of the coupling-head into the casing or shell, (the raised portions 3 entering the recesses 7,) and after the shank 2 has been inserted as far as possible the coupling-head is turned slightly within the casing or shell, which of course turns the raised portions 3 into the recesses 8, and thus locks the coupling-head to the shell or casing in a manner that will be well understood from an inspection of the drawings. The shell or casing 9 is provided with a slot 10, (see particularly Fig. 5,) which when the shank has been inserted and turned, as just described, coincides with the slot 5 in the said shank, and if the bar 6 be now inserted through the slot 10 of the shell and the slot 5 of the coupling-head the shank 2 will be securely locked within the casing or shell 9, as the said bar 6 prevents the raised portions 3 of the shank from being turned out of their recesses 8. Immediately over the recesses 7 and 8 I form raised portions 11 on the exterior of the shell or casing 9; but these merely serve the purpose of strengthening the shell or casing at the point where it would otherwise be weakened by forming the recesses 7 and 8. I prefer that the lateral recesses 8 in the shell be formed at a slight angle, in which case they will have the effect of screw-threads, and the partial rotary movement of the shank 2 in said shell therefore acts to make a tight joint between said shank and shell.

I have described what I consider the preferable method of connecting the shank of the coupling-head with the shell or casing of the draft mechanism; but it is obvious that other forms of connection may be used, and though I have some claims based on the specific construction I do not limit my claims to the exact construction illustrated.

By forming the coupling-head 1 and the shell or casing 9 in two main parts, as described, I am enabled to employ a very simple form of shell or casing, as seen best in Figs. 1 and 2. As there shown, the shell or casing 9 consists of nothing more than a single casting, with recesses 7 and 8 and the slots 10, as before mentioned, two additional slots 12 and 13, and two sets of cross-ribs 14 and 15, which are connected together by central webs 16 and 17, the aforesaid slots 12 being located on each side of these ribs and webs, as seen in Figs. 1 and 2. To those familiar with this style of draft mechanism it will be obvious that the springs 18 and 19 may be inserted within the shell or casing 9 from opposite ends thereof before the coupling-head 1 has been connected to the shell 9 and before the bar 6, hereinbefore mentioned, and the rear bar 20 are placed in position in their respective slots 10 and 13. Of course after the springs have been placed in position the central bar 21 and the rear bar 20 can be inserted, after which the coupling-head 1 is inserted, as hereinbefore described, and securely held in position by inserting the front cross-bar 6. The coupling and draft mechanism may now be found ready for use, and from an inspection of my drawings it will be apparent that I have invented a very simple form of mechanism.

In some cases I may prefer to cast the cylindrical shell or casing 9 without the ribs 14 and 15 and webs 16 and 17, hereinbefore described, and in order to take their places I employ the construction shown in Figs. 8, 9, and 10, in which I cast the cylindrical shell with recesses 22 and 23 at the top and bottom thereof, as shown in Figs. 8 and 9, and form slots 24 and 25 in the walls of said recesses. I then slip a cast block 26 into each of said recesses. These blocks are inserted through said cylindrical shell until they come opposite their recesses 22 and 23 and are provided with a rib 27, which is inserted through the aforesaid slots 24 and 25, and the cast block is thus held in place. It will of course be understood from an inspection of these figures that one of these is used on opposite sides of the shell or casing, so as to leave room for the central flat bar between them, and after said bar has been inserted in position it securely holds said block in place. In my former patent I have employed the blocks; but they have been bolted in position; but I much prefer the ribs 27 and their slots 24 and 25.

In my draft mechanism, as illustrated in my aforesaid patent, No. 671,370, I have relied on the strength of the angle-irons (shown at 30 and 31 in Fig. 1 of the present application) to withstand the main load transmitted to the central bar 21. In my present invention I employ means to assist the angle-irons 30 and 31 to withstand said load, and this means consists of the tie or draw rods 32 and 33. (Shown particularly in Figs. 1, 6, and 7.) These tie or draw rods consist of heavy straps or loops 34, which pass over the central bar 21, so as to have no movement with relation thereto, and where these straps or bars pass over the rear bars 20 the straps or bars are slotted, as shown at 35, so that the said rear bar may have movement within its slot 13 when a pull is exerted on the draw-head 1. The tie-rods extending from the straps pass from one rigid bar 21 at one end of the car to the similar bar 21 at the opposite end and may be continuous or may be connected by turnbuckles or be connected with the cross-timbers of the car in any desired manner, the object being to assist the flat bar 21 in withstanding the shocks imparted to the coupling-head 1.

I am aware that means of tying one coupler to another is old and is shown in my own patents, an example of which may be seen in Patent No. 515,044, of February 20, 1894; but no claim is herein made, broadly, to this structure.

It will be obvious that when a single and not the tandem form of mechanism is used, as illustrated in my before-mentioned patent, the tie-rods are connected with the front flat bar instead of the central one, as herein shown, as in the single form it is in the first flat bar, which has no movement in the draft-irons.

It will be manifest from an inspection of my drawings that I have invented a very simple form of draft mechanism and one that is so simple that ordinary castings may be used. In fact, with the construction shown in Figs. 8 and 9 it would be possible to use wrought pipe instead of cast shells. I therefore do not limit my claims to the exact construction shown, but intend them to cover any variations and modifications that fall within the scope of my invention.

What I claim as new is—

1. In a device of the character described, the combination of a shell or casing containing a plurality of bars having operative connection with the draft irons or timbers, a spring or tension mechanism contained within said shell or casing and located between said bars, and a coupling-head detachably connected with said shell, substantially as described.

2. In a combined coupling and draft mechanism, the combination of a shell or casing containing a plurality of bars having operative connection with the draft-irons, a spring contained within said shell or casing and located between said bars, and a coupling-head detachably connected with said shell, the said shell being open at the end which connects with said coupling-head, substantially as described.

3. In a combined coupling and draft mechanism, the combination of a shell or casing containing the spring or tension mechanism, a coupling-head detachably connected with said shell, and a bar connecting the said shell with the draft-irons, the said bar also locking the coupling-head to said shell, substantially as described.

4. In a combined coupling and draft mechanism, the combination of a shell or casing and with the draft-irons, of a plurality of bars passing through said shell and draft-irons, a spring located within the shell and between said bars, and a coupling-head detachably connected with said shell or casing, one of the aforesaid bars forming a means of locking said head to said casing, substantially as described.

5. In a device of the character described, the combination with a coupling-head of a shell or casing detachably connected with and movable with said coupling-head and adapted to contain the springs or tension mechanism, slots in said casing for the passage of bars, and abutting portions as the ribs 14 and 15 for coacting with the springs, substantially as described.

6. In a device of the character described, a shell or casing movable with the draw-bar and adapted to contain the springs, slots in said casing for the passage of bars, abutting portions within the said casing or shell, the latter being open at one end for the insertion of the spring, and a coupling-head detachably connected to said open end, substantially as described.

7. In a device of the character described, a casing or shell for containing the springs, slots in said casing for the passage of bars, abutting portions within the casing or shell for coacting with the springs, and a coupling-head having Master Car-Builders' lines detachably connected with said casing or shell and moving with the same, substantially as described.

8. In a device of the character described, a casing or shell for containing the springs, abutting portions formed on the interior thereof for coacting with the springs, the said casing or shell being open at both ends for the reception of the springs and being movable with the coupling-head, substantially as described.

9. In a device of the character described, a coupling-head having a short shank with projections thereon, in combination with a casing or head adapted to contain the spring or tension mechanism and constructed to fit over said short shank, said casing having an open end for the reception of the springs and also having recesses coacting with the projections on the shank, whereby said short shank and casing are connected together, substantially as described.

10. In a device of the character described, a cylindric shell or casing adapted to hold the springs, slots in said casing for receiving bars, and abutting portions located near the center of said shell and having ribs passing through slots in said shell, substantially as described.

11. In a device of the character described, a shell or casing adapted to receive the springs, slots in said casing for the passage of bars, and abutting means located near the center of said shell or casing and having a rib passing into an opening in the said shell or casing, substantially as described.

12. In a device of the character described, a casing for draft mechanism having a plurality of bars passing therethrough and through the draft-irons, one of said bars being immovable in said draft-irons, and tie-rods connected with said immovable bar, substantially as described.

13. In a device of the character described, the combination with a casing, slots in said casing, a plurality of bars passing through said slots and through openings in the draft-irons, one of said bars being movable in the draft-irons and the other immovable, and tie-rods firmly connected with the immovable bar, and having slots within which the movable bar works, substantially as described.

Signed by me at Washington, District of Columbia, this 13th day of February, 1902.

PERRY BROWN.

Witnesses:
   Geo. E. Frech,
   Thos. E. Robertson.